US009652551B2

(12) United States Patent
Ingoldby et al.

(10) Patent No.: US 9,652,551 B2
(45) Date of Patent: May 16, 2017

(54) AUTOMATED EFFORT JUDGEMENT OF USER GENERATED CONTENT

(75) Inventors: Michael Ingoldby, Superior, CO (US);
R. Brent Milne, Boulder, CO (US);
Jeffrey C. Ward, Arvada, CO (US);
Krista M. Marks, Boulder, CO (US);
Thomas E. Fischaber, Boulder, CO (US)

(73) Assignee: Disney Enterprises, Inc., Burbank, CA (US)

( * ) Notice: Subject to any disclaimer, the term of this patent is extended or adjusted under 35 U.S.C. 154(b) by 813 days.

(21) Appl. No.: 12/872,621

(22) Filed: Aug. 31, 2010

(65) Prior Publication Data

US 2012/0054638 A1    Mar. 1, 2012

(51) Int. Cl.
| | | |
|---|---|---|
| *G06F 17/30* | (2006.01) | |
| *G06Q 50/00* | (2012.01) | |
| *H04L 12/58* | (2006.01) | |
| *G06Q 30/02* | (2012.01) | |
| *G06F 17/27* | (2006.01) | |

(52) U.S. Cl.
CPC ...... *G06F 17/3089* (2013.01); *G06F 17/2785* (2013.01); *G06Q 30/02* (2013.01); *G06Q 50/01* (2013.01); *H04L 51/32* (2013.01)

(58) Field of Classification Search
CPC ........ G06Q 50/01; G06Q 30/02; H04L 51/32; G06F 17/2785
USPC ................................................ 715/751, 753
See application file for complete search history.

(56) References Cited

U.S. PATENT DOCUMENTS

| | | | | |
|---|---|---|---|---|
| 5,867,799 | A  * | 2/1999 | Lang et al. | |
| 5,995,095 | A  * | 11/1999 | Ratakonda | .................... 715/255 |
| 6,026,410 | A  * | 2/2000 | Allen et al. | |
| 6,978,274 | B1 * | 12/2005 | Gallivan et al. | |
| 6,981,016 | B1 * | 12/2005 | Ryan | ............................. 709/203 |
| 7,013,262 | B2 * | 3/2006 | Tokuda et al. | .................... 704/9 |
| 7,324,944 | B2 * | 1/2008 | Hansen et al. | ................. 704/270 |
| 7,822,631 | B1 * | 10/2010 | Vander Mey et al. | ........ 705/7.29 |
| 8,001,003 | B1 * | 8/2011 | Robinson et al. | .......... 705/14.53 |
| 8,056,121 | B2 * | 11/2011 | Hamilton et al. | ................. 726/4 |
| 8,108,255 | B1 * | 1/2012 | Robinson et al. | .......... 705/14.44 |
| 8,140,380 | B2 * | 3/2012 | Keller et al. | .................. 705/7.32 |
| 8,290,811 | B1 * | 10/2012 | Robinson et al. | ............ 705/7.32 |
| 8,639,512 | B2 * | 1/2014 | Marquette et al. | ............ 704/270 |
| 8,868,489 | B2 * | 10/2014 | Hood | ...................... G06Q 10/10 705/300 |
| 8,949,876 | B2 * | 2/2015 | Ismail | ..................... G06Q 10/10 705/26.1 |
| 2001/0034630 | A1 * | 10/2001 | Mayer et al. | ...................... 705/7 |
| 2002/0040333 | A1 * | 4/2002 | Fuwa | ................................ 705/27 |
| 2003/0154070 | A1 * | 8/2003 | Tokuda et al. | .................... 704/9 |
| 2003/0228561 | A1 * | 12/2003 | Escalante | ....................... 434/219 |
| 2004/0193409 | A1 * | 9/2004 | Hansen et al. | ................. 704/215 |

(Continued)

*Primary Examiner* — Jeffrey A Gaffin
*Assistant Examiner* — John M Heffington
(74) *Attorney, Agent, or Firm* — Patterson + Sheridan, LLP (57) ABSTRACT

Techniques are described for estimating the effort involved in creating content on a content site. Embodiments of the invention may collect data by monitoring actions taken by a user creating content on the site, and may then calculate an effort value for the created content based on the collected data. The calculated effort value may then be used, for example, to determine a position in a moderation queue for inserting the user-created content, or to determine whether to feature a particular user on the site.

25 Claims, 8 Drawing Sheets

(56) References Cited

U.S. PATENT DOCUMENTS

| | | |
|---|---|---|
| 2005/0034071 A1* | 2/2005 | Musgrove et al. ........... 715/530 |
| 2007/0021506 A1* | 1/2007 | Smriga et al. ................ 514/564 |
| 2007/0073559 A1* | 3/2007 | Stangel ............................ 705/2 |
| 2008/0235721 A1* | 9/2008 | Ismail et al. .................... 725/16 |
| 2009/0083288 A1* | 3/2009 | LeDain et al. ................. 707/10 |
| 2009/0087822 A1* | 4/2009 | Stanton et al. ............... 434/156 |
| 2009/0132950 A1* | 5/2009 | Gibson et al. ................ 715/780 |
| 2009/0271192 A1* | 10/2009 | Marquette et al. ........... 704/235 |
| 2010/0088182 A1* | 4/2010 | Ryder ................. G06Q 10/107 |
| | | 705/14.66 |
| 2010/0217654 A1* | 8/2010 | Keller et al. ................. 705/14.2 |
| 2010/0293032 A1* | 11/2010 | Engelsma et al. ............. 705/10 |
| 2011/0053124 A1* | 3/2011 | Jung ............................ 434/157 |
| 2011/0093329 A1* | 4/2011 | Bodor et al. ............. 705/14.42 |
| 2011/0119330 A1* | 5/2011 | Baldwin et al. ............. 709/203 |
| 2011/0307307 A1* | 12/2011 | Benmbarek ................. 705/14.4 |
| 2011/0307340 A1* | 12/2011 | Benmbarek ............... 705/14.73 |
| 2011/0307397 A1* | 12/2011 | Benmbarek ................. 705/319 |

\* cited by examiner

AUTOMATED EFFORT JUDGEMENT OF USER GENERATED CONTENT

BACKGROUND

Field of the Invention

Embodiments of the invention relate to rating content, and more particularly, to rating user-created content based on a determined effort value.

Description of the Related Art

Content sharing websites account for some of the most popular websites today. Generally, content sharing websites allow users to post content and share posted content with other users. For example, a user may upload a user-created video to a content sharing website, and then share the uploaded video with other users. Furthermore, a number of content sharing websites also allow users to create new content, which can then be shared with other users of the site. As an example, a content sharing website may enable users to create images using the website, and then share the created images with other users of the website.

Similar to other websites, content sharing websites have an interest in moderating the content that appears on their websites. For example, a content sharing website may wish to prevent the sharing of any content that is protected under a third party's intellectual property rights. As a second example, a family-oriented content sharing website may wish to prevent any offensive content from appearing on their site. However, because the creators of these content sharing sites have little control in what content is posted or created using their site, many content sharing websites use some form of content filtering or moderation to control the content appearing on their site.

SUMMARY

One embodiment of the invention includes a method for managing user-created content on a site. This method may generally include providing an interface configured to allow users to interactively create content, monitoring one or more actions taken by a first user while creating content for the site, and determining an effort value for the created content based on the monitored one or more actions. The effort value reflects an estimated amount of effort expended by the first user in creating the content. Based at least in part on the determined effort value at least one of (i) moderation of the created content and (ii) sharing of the created content is affected on the site.

Another embodiment of the invention includes a system having a computer processor and a memory containing a program which, when executed on the computer processor, performs an operation for managing user-created content on a site. The operation itself may generally include providing an interface configured to allow users to interactively create content, monitoring one or more actions taken by a first user while creating content for the site, and determining an effort value for the created content based on the monitored one or more actions. The effort value reflects an estimated amount of effort expended by the first user in creating the content. Based at least in part on the determined effort value at least one of (i) moderation of the created content and (ii) sharing of the created content is affected on the site.

Still another embodiment of the invention includes a computer-readable storage medium containing a program that, when executed, performs an operation for managing user-created content on a site. The operation itself may generally include providing an interface configured to allow users to interactively create content, monitoring one or more actions taken by a first user while creating content for the site, and determining an effort value for the created content based on the monitored one or more actions. The effort value reflects an estimated amount of effort expended by the first user in creating the content. Based at least in part on the determined effort value at least one of (i) moderation of the created content and (ii) sharing of the created content is affected on the site.

BRIEF DESCRIPTION OF THE DRAWINGS

So that the manner in which the above recited aspects are attained and can be understood in detail, a more particular description of embodiments of the invention, briefly summarized above, may be had by reference to the appended drawings. Note, however, that the appended drawings illustrate only typical embodiments of this invention and are therefore not to be considered limiting of its scope, for the invention may admit to other equally effective embodiments.

DETAILED DESCRIPTION

Many content sharing websites have an interest in regulating what content may be shared on their site. For example, content sharing websites may wish to prohibit the sharing of offensive content or content protected by a third party's intellectual property rights. However, because it can be difficult to automatically determine which content is inappropriate for posting on the content sharing website, many such sites manually moderate the posting of new content. For example, when new content is uploaded or created, the content may be placed in a moderation queue. Moderators may then retrieve content from the moderation queue in a particular order (e.g., first in, first out) and determine whether the content is appropriate for the content sharing website. Furthermore, submitted or created content may not be available for sharing with other users until a moderator has first approved the content.

One potential drawback to this manner of moderating content is that content that required little time or effort to create is treated the same as content that took a substantially amount of time and effort to create. For example, assume that a first user spends several hours on the content sharing website creating a detailed picture, and a second user spends only a few seconds creating a picture containing only a few scribbles. In such an example, if both pictures are simply placed into a moderation queue in the order they are created, the first user will have to wait just as long as the second user for his content, even though the first user expended much more time and effort in creating his picture. Furthermore, because there is often a correlation between how interesting content is and how much time and effort went into producing the content, this results in the more interesting content being given equal priority in the moderation queue as the less interesting content. Additionally, although many examples given herein involve user-creates images, more generally, any content created by users of the site including, without limitation, animations, videos, music, and textual works.

Embodiments of the invention provide a method of moderating user-created content on a content sharing site. Embodiments of the invention may monitor the user while the user is creating the content and collect data related to the creation of the content. Once the user has finished creating the content, embodiments may calculate an effort value for the created content, based on the collected data. Embodiments of the invention may then determine a position for inserting the created content into a moderation structure, based on the calculated effort value. Embodiments may then insert the created content into a moderation structure for review by a moderator at the determined position.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a content creation application) or related data available in the cloud. For example, the content creation application could execute on a computing system in the cloud and allow users to dynamically create and share content in the cloud. In such a case, the content creation application could monitor the creation of the content and calculate an effort value for the created content. In such a case, the content creation application may then insert the created content into a moderation structure, so that the created content may be moderated in an order according to its determined effort value. Doing so allows a user to create and share content from any computing system attached to a network connected to the cloud (e.g., the Internet).

Figure 1A:
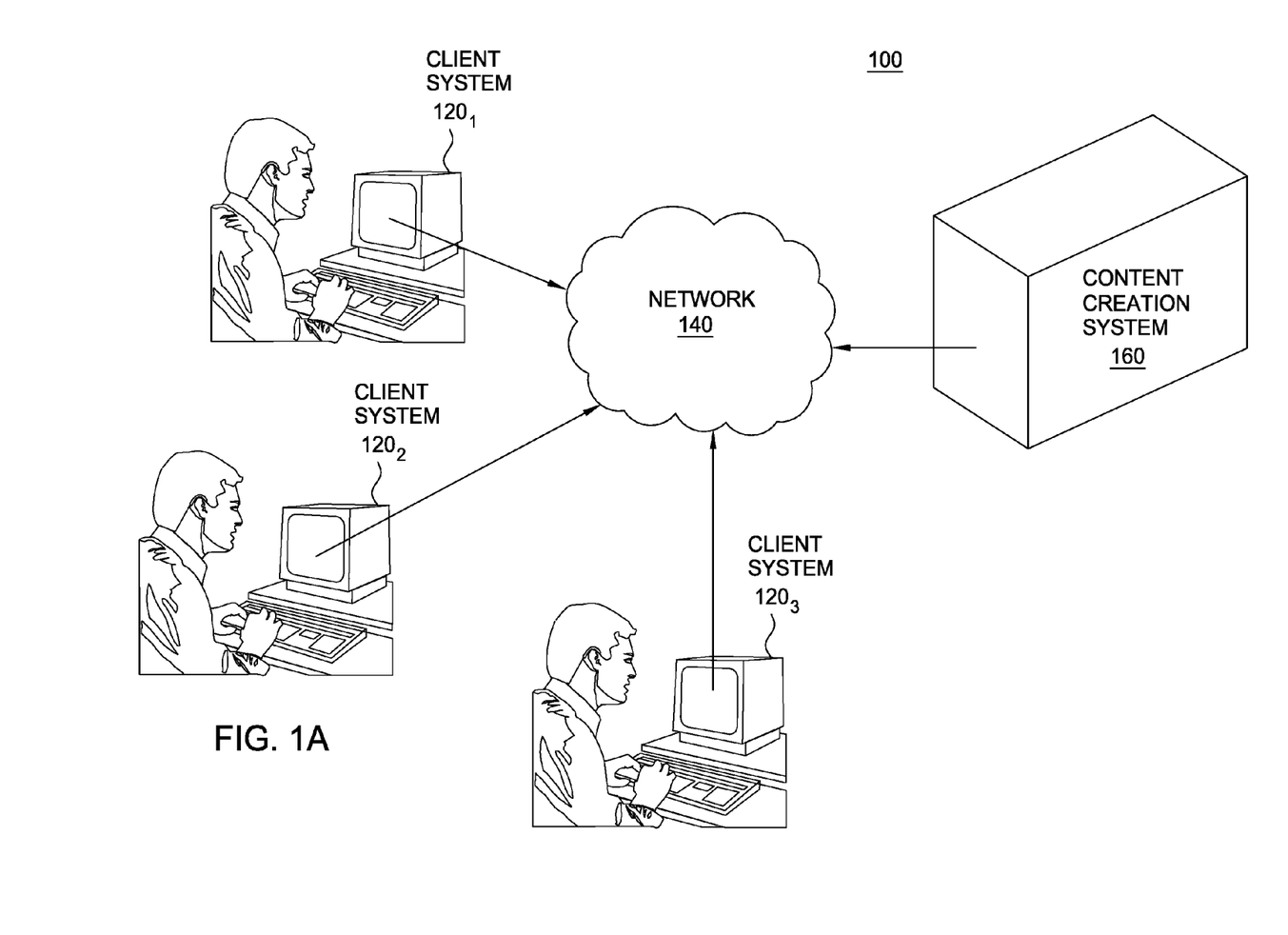
FIGS. 1A-1B illustrate networked systems configured to share user-created content, according to embodiments of the invention.
Figure 1B:
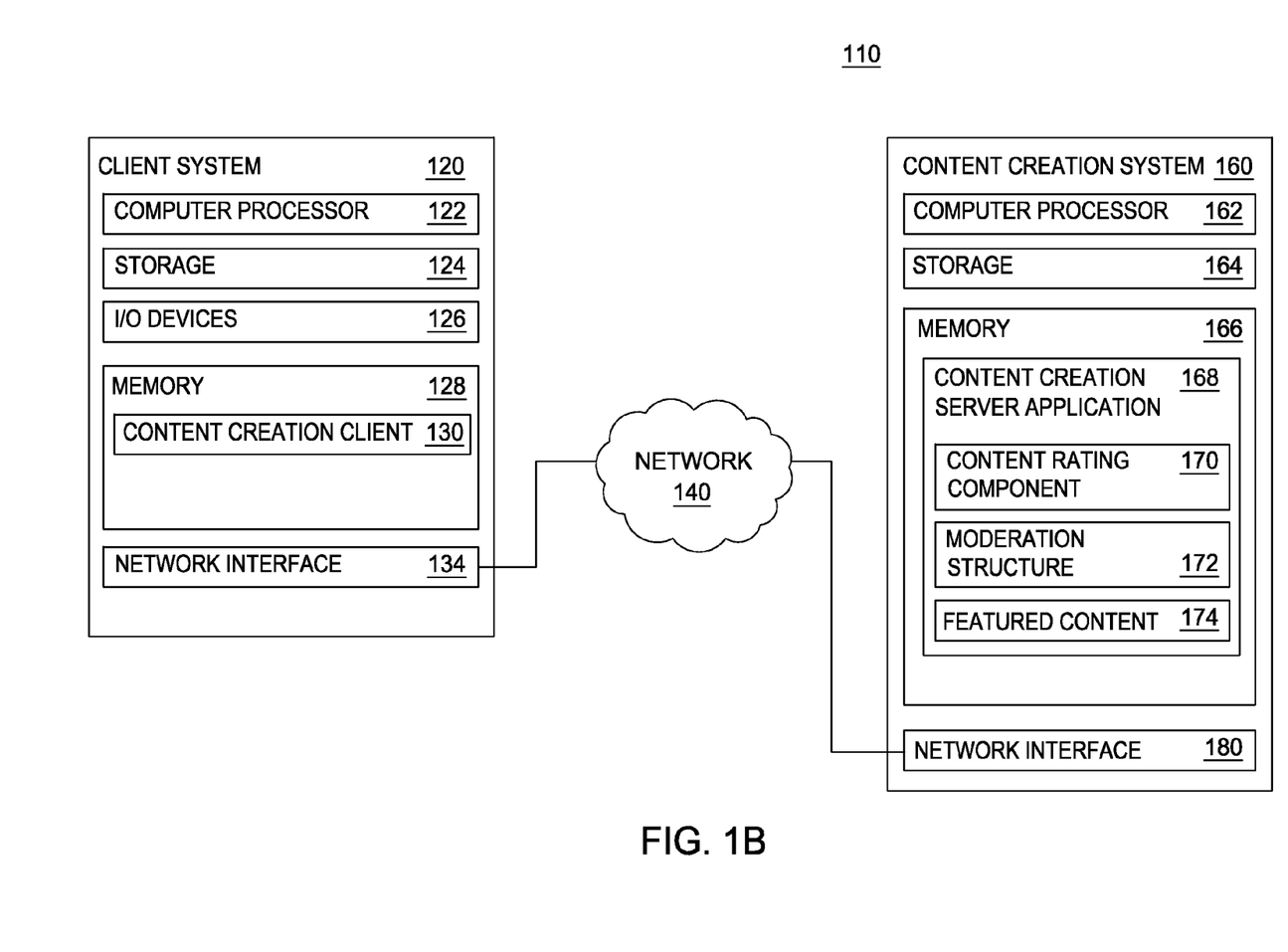

Referring now to the Figures, FIGS. 1A-1B illustrate networked computer systems configured to share user-created content, according to embodiments of the invention. More specifically, FIG. 1A shows a system 100 that includes three client systems 120, a network 140, and a content creation system 160. The client systems 120 may include a content creation client application and the content creation system 160 may host a content creation site. The client on the client system 120 may connect to a server application on the content creation system 160 using the network 140. The client may allow a user to interactively create and share content with other users connecting to the content creation system 160.

Generally, users of the client systems 120 may create or send content to the content creation system 160, where the content may then be shared with other users. For example, a first user of client system 120$_1$ may create an image using the content creation client, and may then share the created image with a second user of client system 120$_2$. The content creation site may also require submitted content to be approved before the content may be shared with other users. For example, a family-oriented content sharing site may wish to avoid sharing any adult-oriented content. One method of evaluating content is by using human moderators to review submitted content before the content may be shared. The exemplary content creation site may place newly submitted content into a moderation structure (e.g., a queue), from which content may be retrieved for review. The content may be retrieved from the moderation structure and reviewed in a specified order (e.g., in the order it was received).

One disadvantage to simply using a moderation structure for reviewing content is that such an approach treats all content equally, even though some content may be more likely to be approved or may be more interesting to viewers than other content. For example, assume a first user spent a substantial amount of time creating a detailed picture on the content creation site, while a second user spent only a very short amount of time creating a picture containing only a single line. In such an example, even though the first user put much more effort into his picture than the second user, both pictures may be placed into the same moderation structure and reviewed in the order they were received. However, because the amount of effort expended in creating content often correlates to how interesting the content is to view, the content sharing site may wish to give a preference to the content created by the first user.

As a second example, assume that the first user has previously created content on the content sharing site that has been highly reviewed and has always been approved for sharing by the moderators. Furthermore, assume that the second user has previously created content that the moderators have always rejected, because the previously-created content was deemed to be adult-oriented. In such an example, if both the first user and the second user create and submit new content to the content sharing site, both content submissions may be placed in the moderation structure and evaluated in the order they were received. However, because of their previous content submissions, the content sharing site may wish to give a preference to the content created by the first user.

Embodiments of the invention may monitor a user's actions while the user creates new content on the content sharing site. For example, a software application may be configured to monitor a number of brushstrokes used in creating the content, an amount of time taken to create the content, how often elements in the content are repositioned, how many times elements of the content are changed, and the extent of any such changes. Once the content is created and submitted for review, the monitoring application may determine an effort rating for the submitted content. As an example, if the user used a high number of brushstrokes and a substantial amount of time in creating the submitted content, embodiments may calculate a higher effort value for the content (i.e., determine that more effort was expended in creating the content). Likewise, if the user only used only a few brushstrokes and spent a relatively short amount of time creating the submitted content, embodiments may calculate a lower effort value for the content (i.e., determine that little effort was expended in creating the content).

Once the effort value is calculated, embodiments of the invention may use the effort value in various ways to improve the content sharing site. For instance, rather than simply placing submitted content at the end of a first in, first out moderation structure, the submitted content may be inserted into the moderation structure at a determined position, based on the effort value calculated for the content. As an example, if the monitoring application determines that a user expended a substantial amount of effort in creating a piece of submitted content (e.g., a high effort value was calculated for the content), the content may be inserted into the moderation structure closer at a position where the content will be reviewed by a moderator more quickly. Likewise, if the monitoring application determines that the user expended a relatively low amount of effort creating the content, the content may be inserted into the moderation structure at a position where the content will be reviewed less quickly. Doing so allows the monitoring application to use the calculated effort value to prioritize content in the moderation structure and effectively allow the higher effort (and likely more interesting) content to be reviewed and shared on the content sharing site more quickly.

FIG. 1B is a block diagram of a networked system configured to share user-created content, according to one embodiment of the invention. As shown, the system 110 includes a client system 120 and a content creation system 160, both connected to the network 140. The client system 120 contains a computer processor 122, storage media 124, I/O devices 126, memory 128 and a network interface 134. Computer processor 122 may be any processor capable of performing the functions described herein. I/O devices 126 may represent a variety of input and output devices, including keyboards, mice, visual displays, printers and so on. The client system 120 may connect to the network 140 using the network interface 134. Furthermore, as will be understood by one of ordinary skill in the art, any computer system capable of performing the functions described herein may be used. Furthermore, although the depicted embodiment only a single client system connecting to the content creation system 160 via the network 140, such a depiction is for illustrative purposes only, and one of ordinary skill in the art will quickly recognize that any number of client systems 120 may connect to any number of content creation systems 160.

In the pictured embodiment, memory 128 contains a content creation client 130. Although memory 128 is shown as a single entity, memory 128 may include one or more memory devices having blocks of memory associated with physical addresses, such as random access memory (RAM), read only memory (ROM), flash memory or other types of volatile and/or non-volatile memory. The client 130 may generally connect to a content creation server. For example, according to one embodiment of the invention, the client 130 represents a web browser. Once connected to the server, the client 130 may display an interface for creating and viewing content (e.g., using one or more I/O devices 126, such as a monitor).

The content creation system 160 contains a computer processor 162, storage media 164, memory 166 and a network interface 180. Computer processor 162 may be any processor capable of performing the functions described herein. The content creation system 160 may connect to the network 140 using the network interface 180. Furthermore, as will be understood by one of ordinary skill in the art, any computer system capable of performing the functions described herein may be used. Additionally, although memory 166 is shown as a single entity, memory 128 may include one or more memory devices having blocks of memory associated with physical addresses, such as random access memory (RAM), read only memory (ROM), flash memory or other types of volatile and/or non-volatile memory.

In the pictured embodiment, memory 166 contains a content creation server application 168. The server application 168 contains a content rating component 170, a moderation structure 172 and featured content 174. The content rating component 170 generally monitors a user's actions while the user is creating new content and calculates an effort value for the created content. The moderation structure 172 may contain content that has been created but has not yet been approved (e.g., by a moderator) for sharing. The featured content 174 may contain submitted content or artists currently being featured on the content sharing site.

Generally, a user may use the content creation client 130 on the client 120 may connect to the content creation server application 168 and allow the user to create and submit content. The content rating component 170 may monitor the user's actions while the user creates the new content and may generate an effort value for the new content. In one embodiment of the invention, such monitoring may be performed on the client system 120 (e.g., by the content creation client 130). The content rating component 170 may then determine a position in the moderation structure 172 for the content based on the calculated effort value, and insert the content into the moderation structure 172 for review at the determined position. By doing this, embodiments of the invention may allow higher effort content to be reviewed and posted to the content sharing site more quickly than lower effort content. As such, embodiments may provide an incentive for users to expend more effort in creating their content and to create more interesting content as a result.

Additionally, in one embodiment, the content rating component 170 may determine whether to feature a particular artist, based on the effort values calculated for the content submitted by the artist. For example, if a user has submitted five different pictures to the content sharing site, and the content rating component 170 calculated a high effort value for all five, the content rating component 170 may decide to feature the user's works, and may add the user to the featured content 174. Advantageously, by featuring artists whose works receive a high effort value, embodiments of the invention reward users who expend a substantial amount of effort creating content, and thus encourage users to create and submit more involved and more interesting content to the content sharing site.

Figure 2A:
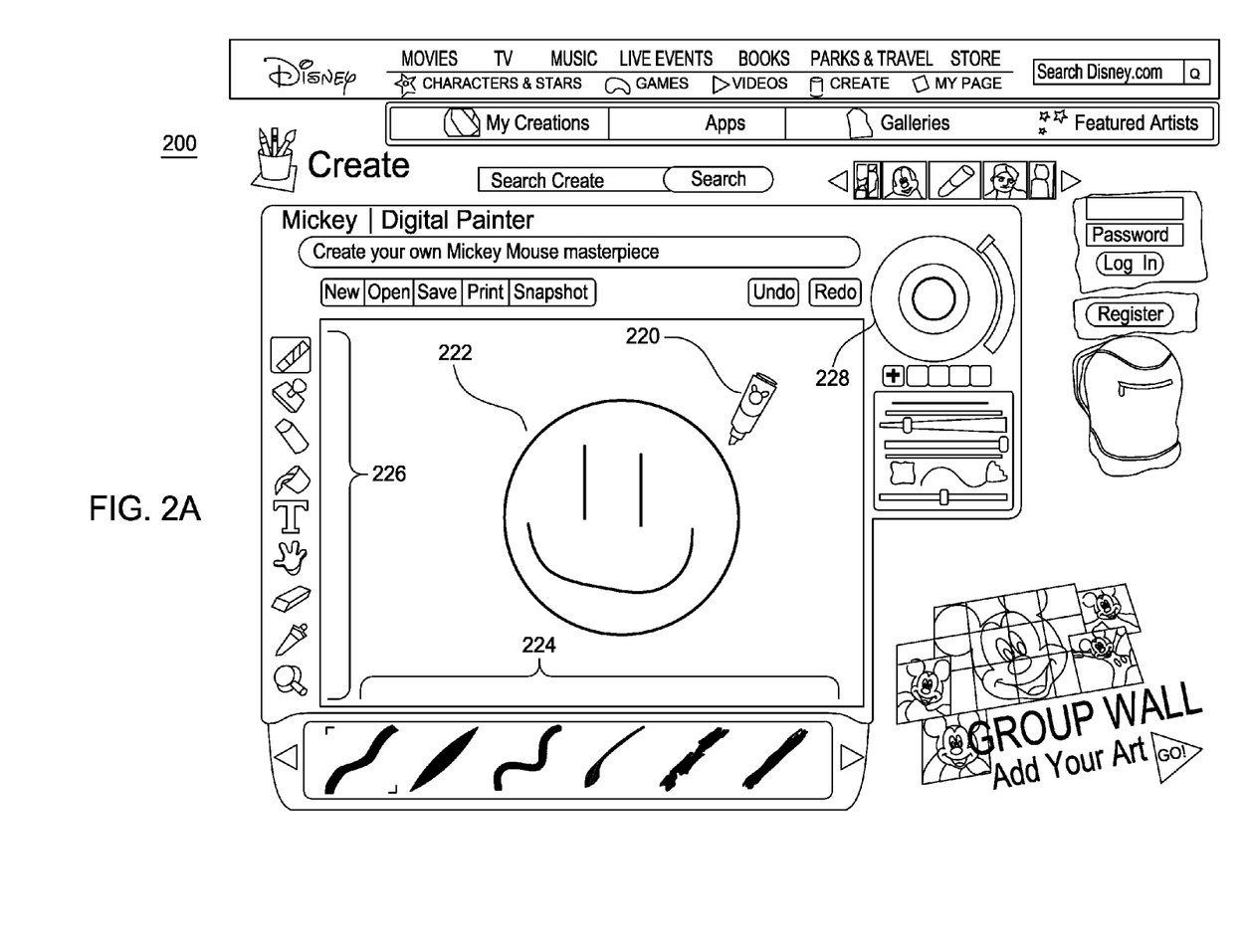
FIGS. 2A-2C are screenshots of an exemplary content sharing site, according to embodiments of the invention.
Figure 2B:
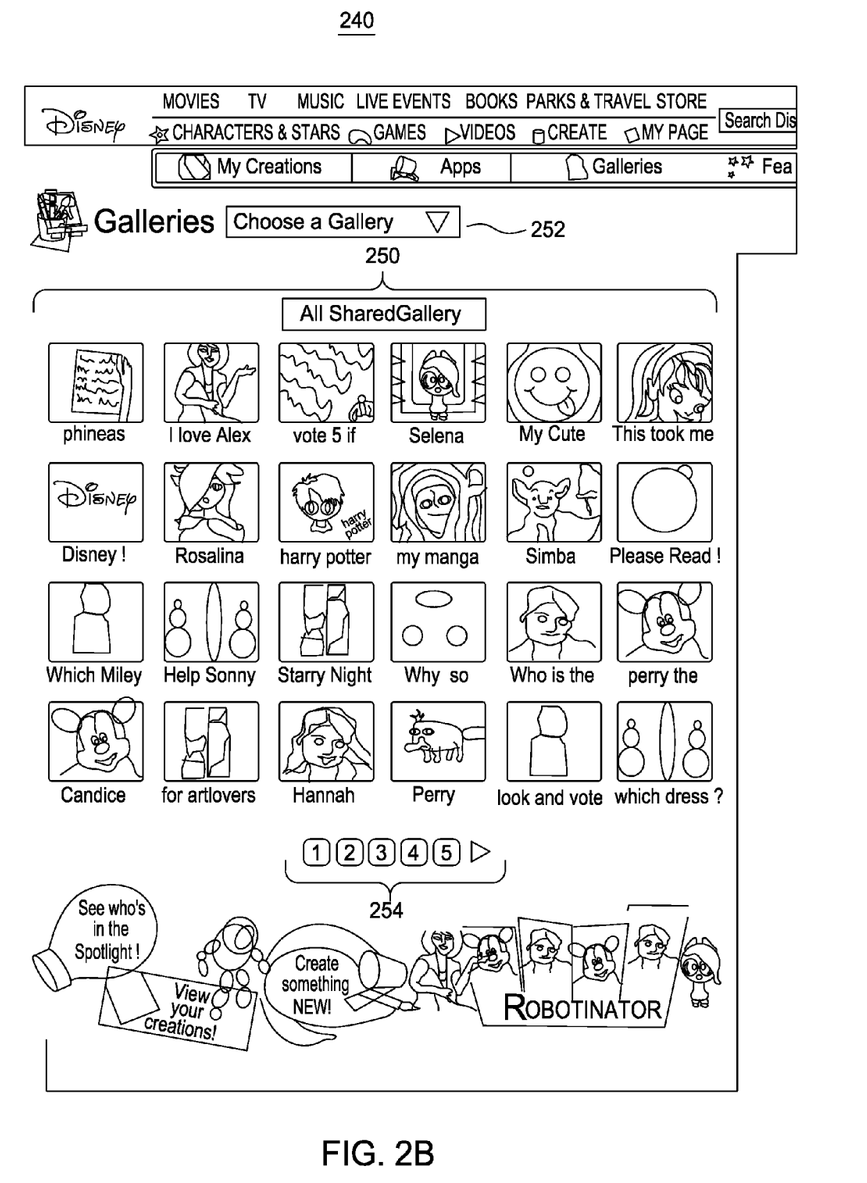
Figure 2C:
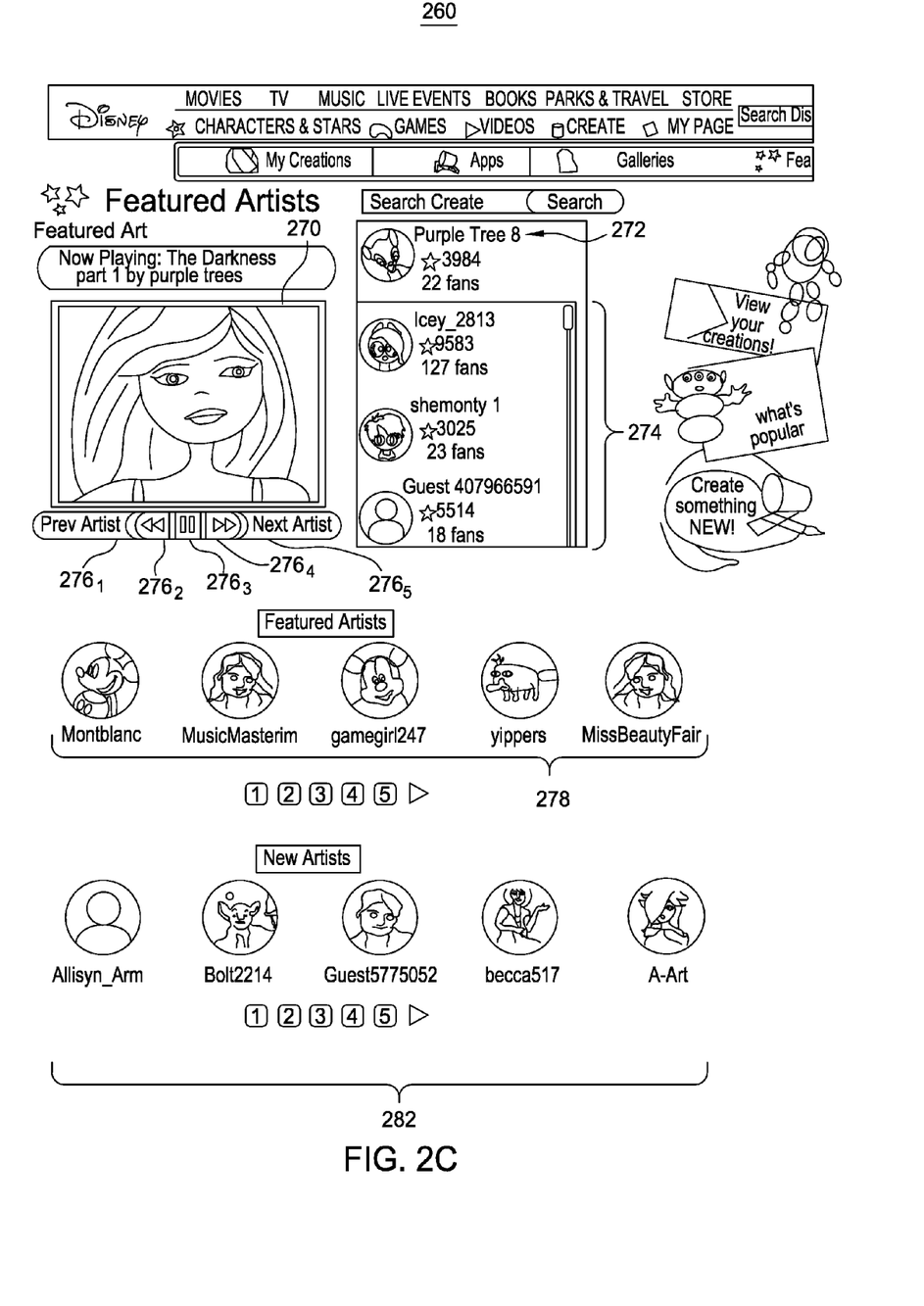

FIGS. 2A-2C are screenshots of an exemplary content sharing site, according to embodiments of the invention. More particularly, FIG. 2A is a screenshot 200 of a content creation page of a content sharing site, according to one embodiment of the invention. As shown, the content creation page includes a cursor 220, an image 222, a plurality of line types 224, a plurality of tools 226 and a color selector 228. Generally, the user may use the cursor 220 to select a line type 224 and a color (e.g., using the color selector 228). The user may then use the cursor 220 to create the image 222. Additionally, the tools 226 allow the user to perform other actions, such as inserting stamps (i.e., predefined images) text into the image 222.

As discussed above, the content rating component 170 may monitor a user's actions while the user is creating an image using the content creation page shown in the screenshot 200. For example, each time the user modifies the image 222 by sketching with the cursor 220, the content rating component 170 may increment a number of brushstrokes counter for the image. The content rating component 170 may further monitor other aspects of the creation process, such as how long the user spent creating the image. The component 170 may use this information to infer, for example, that a first user who spent an hour creating an image likely used more effort than a second user who spent only five minutes creating an image.

Of course, these factors need not be used independently of one another, and one of ordinary skill in the art will recognize that embodiments of the invention may use these and other statistics together in calculating the effort value. Thus, continuing the above example, assume the first user began creating an image using the content creation page, but after beginning the process left the computer and returned in an hour to submit the image. In such an example, if the component 170 determines that the first user only used a small number of brushstrokes to create the image, the component 170 may determine that the first user's image should receive a relatively low effort value, since the user was inactive for the majority of the hour spent creating the image.

FIG. 2B is a screenshot 240 of a content display page of a content sharing site, according to one embodiment of the invention. As shown, the screenshot 240 includes a plurality of user-created images 250, a gallery selector 252 and a page selector 254. Generally, as discussed above, user created content may be required to be first approved by a moderator of the content sharing site, before the content will be displayed as images 250 on the content sharing site. The gallery selector 252 may be used for restricting the display to show only certain images. In one embodiment of the invention, the gallery selector 252 allows the user to select a specific theme of images 250 to display. For example, an exemplary gallery selector 252 may allow a user to specify that only images 250 related to Mickey Mouse® should be displayed. Additionally, because the pictured embodiment displays the shared images one page at a time, users may use the page selector 254 to iterate through the various pages of images shared on the content sharing site. Furthermore, as discussed above, although the depicted content sharing site is configured for sharing user-created images, such an example is for illustrative purposes only, and one of ordinary skill in the art will quickly recognize that a content sharing site may of course share other types of user-created content.

FIG. 2C is a screenshot 260 of a featured artist page of a content sharing site, according to one embodiment of the invention. As shown, the screenshot 260 includes content 270 submitted by the featured artist, an identifier for the featured artist 272, and a plurality of users designated as fans of the artist 274. Additionally, the screenshot 260 shows a number of control buttons 276 that allow users to iterate through other submitted content 270 by the featured artist, as well as iterate through other artists featured on the content sharing site. The depicted featured artist page also includes a plurality of links to other featured artists 278 and a plurality of links to new artists 282.

As discussed above, the content rating component 170 may designate certain users of the content sharing site as featured artists. In one embodiment of the invention, the content rating component 170 determines featured artists based on at least in part an effort value calculated for each of the artist's submitted works. For example, if the content rating component 170 determines that a particular artist has continually submitted content having a high effort value, the component 170 may determine that the works of the artist should be featured on the content sharing site. By doing this, embodiments of the invention may give incentives for users to expend a high amount of effort in creating new works, and thus may encourage users to submit better quality and more interesting content to the content sharing site.

Figure 3:
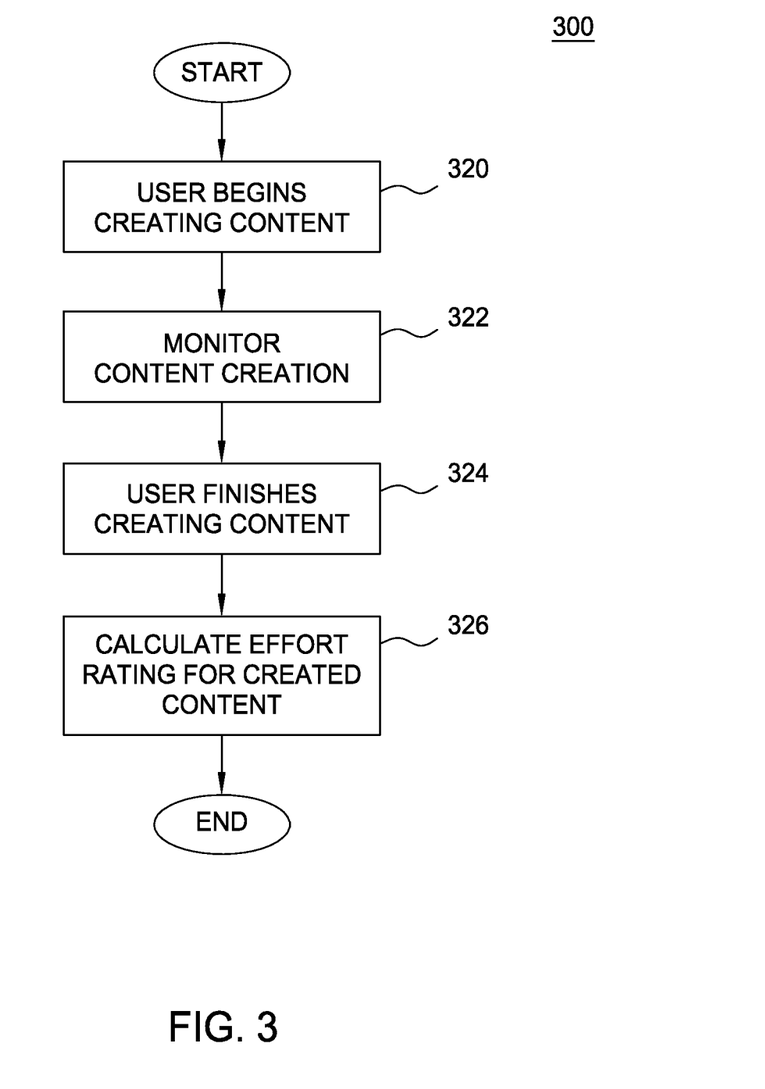
FIG. 3 is a flow diagram illustrating a method of estimating the effort associated with user-created content, according to one embodiment of the invention.

FIG. 3 is a flow diagram illustrating a method of estimating the effort associated with user-created content, according to one embodiment of the invention. As shown, the method 300 begins at step 320, where a user begins creating new content on the content sharing site. Once the user begins creating new content, the content rating component 170 begins monitoring the creation of the content (step 322). As discussed above, the content rating component 170 may monitor actions such as the number of brushstrokes and the amount of time taken to create the content. Additionally, the content rating component 170 may also monitor the number of changes made to the content and the extent to which the content is modified by each change. For example, if the user has adjusted the position of a particular object within the image (e.g., a stamp) numerous times, the content rating component 170 may determine that the user is aligning the step to fall within a margin to be visually pleasing, and adjust the effort rating accordingly.

Additionally, the content rating component 170 may also take into account whether the user-created content contains any text and if so, how much text is included in the content. For example, if the user has included a short paragraph telling a story in the user-created content, the content rating component 170 may determine the user has invested substantial effort into this content, and adjust the effort rating accordingly. In one embodiment of the invention, the content rating component 170 may compare text included in the user-created content with a predetermined list of words (e.g., a dictionary) and determine a number of matches between the two. By doing this, the content rating component 170 may distinguish between user-created content that contains numerous actual words (i.e., indicative of more effort) and content that contains a lot of text but little or no actual words (i.e., indicative of less effort).

At some later point in time, the user finishes creating the content (step 324), and the content rating component 170 calculates an effort rating for the newly created content (step 326). Generally, the effort rating may be calculated based on any data related to the user-created content. Furthermore, although several examples of exemplary types of data are given above, one of ordinary skill in the art will quickly recognize that these examples are without limitation and are for illustrative purposes only. Moreover, the content rating component 170 may use any data related to user-created content and indicative of effort to create the effort rating. Once the content rating component 170 calculates the effort value, the method 300 ends.

Figure 4:
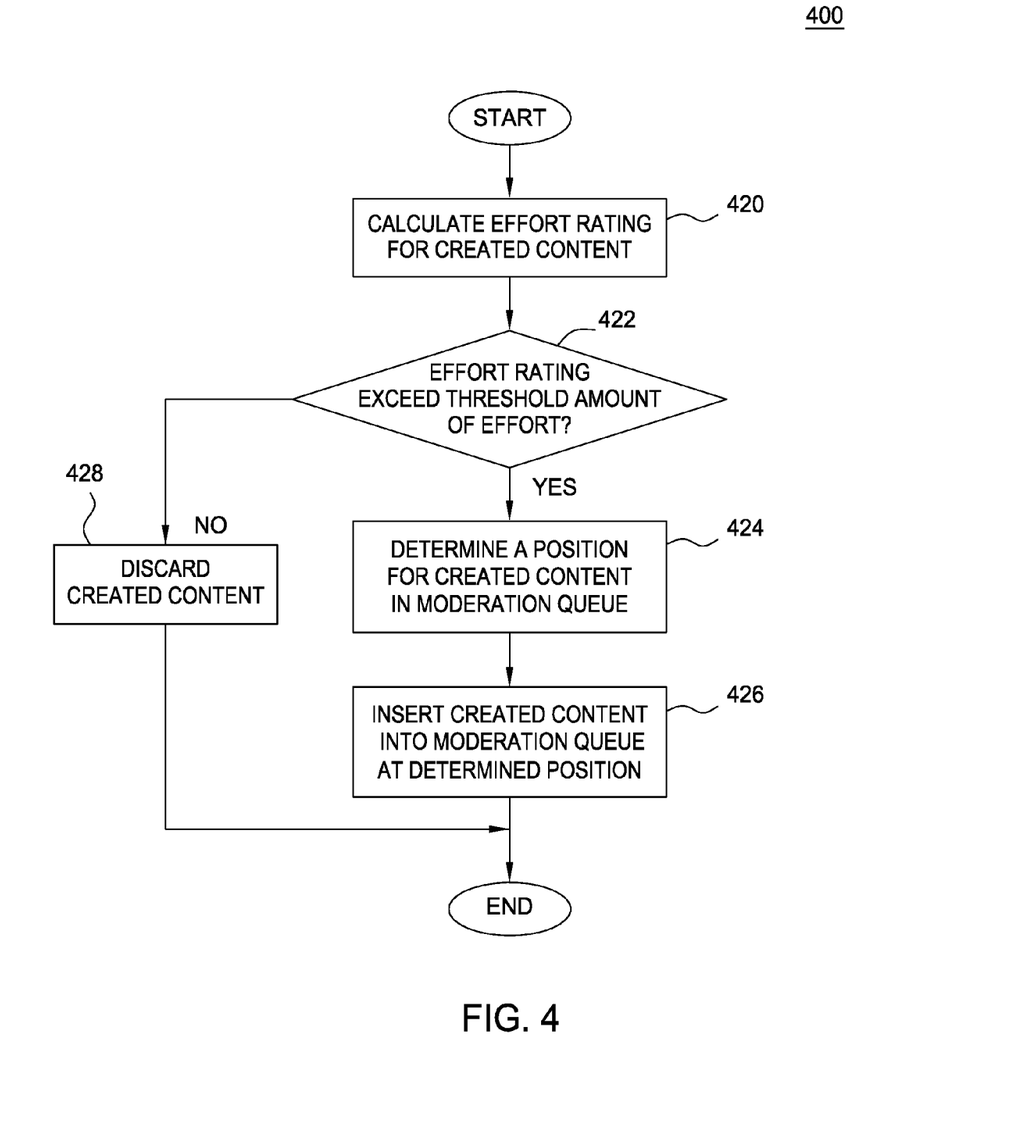
FIG. 4 is a flow diagram illustrating a method of moderating user-created content, according to one embodiment of the invention.

FIG. 4 is a flow diagram illustrating a method of moderating user-created content, according to one embodiment of the invention. As shown, the method 400 begins at step 420, where the content rating component 170 calculates an effort rating for newly created content. According to one embodiment of the invention, the content rating component 170 may calculate the effort value using the method 300 described above. Once the content rating component 170 calculates the effort rating, the content rating component 170 determines whether the calculated effort rating exceeds a threshold amount of effort (step 422). As illustrated here, the content rating component 170 may be configured to discard content whose effort rating is less than a threshold amount. For example, assume a particular user was quickly browsing the content creation site, spent a few seconds creating an image with only a few brushstrokes, and then left the site. In such an example, the user has likely not invested much effort into the image and moreover the image is likely not very interesting to view. As such, the content creation site may not wish to take up a moderator's time reviewing the image. By screening submitted content based on a minimum effort value, embodiments of the invention may improve the efficiency of the moderation process.

If the content rating component 170 determines the calculated effort rating exceeds the threshold, the content rating component 170 determines a position for the newly-created content in the moderation structure 172 (step 424). Once the position for the newly-created content is determined, the content rating component 170 inserts the content into the moderation structure at the determined position (step 426). Generally, the content rating component 170 gives priority to content with a higher effort rating (i.e., the user spent more effort creating the content), and inserts such content into the moderation structure 172 at a position where it will be reviewed more quickly by a moderator. Likewise, content with a lower effort rating may be inserted into a less prioritized position in the moderation structure 172.

If instead the content rating component 170 determines that the calculated effort rating does not exceed the threshold amount of effort, the content rating component 170 discards the newly-created content (step 428). As discussed above, the content rating component 170 may improve the efficiency of the moderation process by filtering out content that the author put minimal effort into. Once the content rating component 170 discards the content, or once the content rating component 170 inserts the content into the moderation structure 172 at the determined position, the method 400 ends.

Advantageously, the method 400 may improve the appeal of the content sharing site by incentivizing the creation of higher-effort (and likely more interesting) content. That is, by using the method 400, users who spend a substantial amount of effort creating content are rewarded by having their content reviewed, and if approved by the moderators, displayed on the content sharing site more quickly. Additionally, by prioritizing higher effort content, the method 400 allows for the more interesting user-submitted content to be posted to the content sharing site more quickly, thus improving the appeal of the site as a whole. Furthermore, the method 400 also filters out content that took only a minimal amount of effort to create, thus improving the efficiency of the content moderation process as well.

Figure 5:
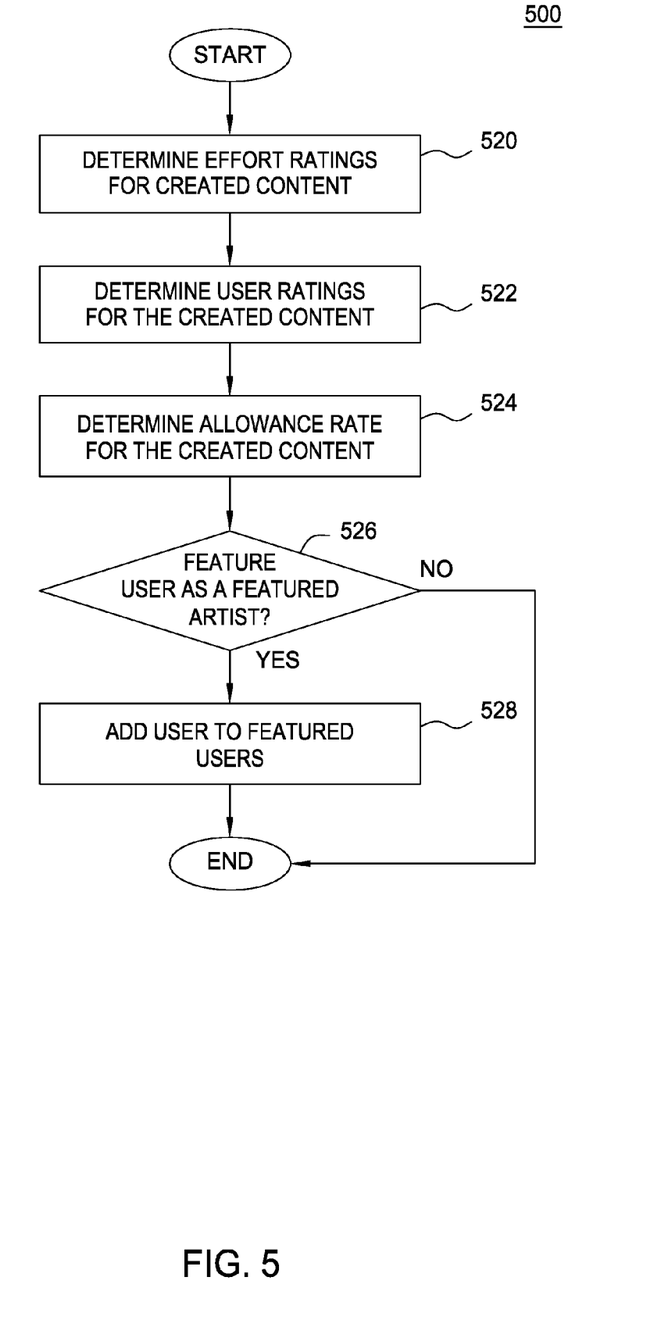
FIG. 5 is a flow diagram illustrating a method of featuring an artist, according to one embodiment of the invention.

FIG. 5 is a flow diagram illustrating a method of featuring an artist, according to one embodiment of the invention. As shown, the method 500 begins at step 520, where the content rating component 170 determines a previously calculated effort rating for each of a particular user's submissions to the content sharing site. For example, if a particular user repeatedly submits content that receives a high effort rating, the content rating component 170 may be more likely to determine the user should be a featured artist of the content site. Likewise, if the user frequently submits low effort content, the content rating component 170 may be less likely to determine the user should be featured on the site. Furthermore, as discussed above, although embodiments of the invention are described in relation to a content sharing site for sharing user-created images, such examples are for illustrative purposes only, and one of ordinary skill in the art will quickly recognize that embodiments may more generally be used with any form of user-created content. Examples of other forms of user-created content include, without limitation, user-created animations, videos, music, and textual works.

Once the effort ratings are determined, the content rating component 170 determines the user ratings for the particular user's submissions to the content sharing site (step 522). Generally, the user ratings represent how other users of the content sharing site have rated the content created by the particular user. For example, in one embodiment of the invention, the user ratings may be represented by a "Thumbs Up" or "Thumbs Down" indicator. Other examples of user ratings include, without limitation, a letter grade (e.g., A, B, C, D, F), a numeric indicator (e.g., on the scale of 1 through 10), a number of stars (e.g., four out of five stars), etc.

Once the user ratings are determined, the content rating component 170 determines an allowance rate for content created by the particular user (step 524). As used here, the allowance rating refers to how often the user's content has been approved by moderators of the site. Thus, if a particular user frequently submits content that is rejected by the moderators for being adult-oriented, the content rating component 170 may be less likely to determine the particular user should be a featured artist. Once the allowance rate has been determined, the content rating component 170 determines whether to feature the particular user as a featured artist on the content sharing site (step 526). If the content rating component 170 determines the particular user should be featured, the content rating component 170 adds the user to the featured content list 174 (step 528). Once the content rating component 170 adds the user to the featured content list 174, or once the content rating component 170 determines the user should not be featured, the method 500 ends.

In addition to determining the position in the moderation structure 172 based on the effort value, the content rating component 170 may consider other factors as well. For instance, the content rating component 170 may determine the position based in part on how often moderators of the site approved content previously submitted by the user. As an example, if the content rating component 170 determines that a particular user has always submitted allowable content (i.e., content that the moderators have approved), the content rating component 170 may determine that it's likely the particular user has again submitted allowable content, and insert the newly-submitted content in the moderation structure 172 at a position where the content will be more quickly reviewed by a moderator. Conversely, if a second user has repeatedly submitted adult-oriented content that has been rejected by the moderators, the content rating component 170 may insert the newly-submitted content from the second user at a less prioritized position in the moderation structure 172.

The content rating component 170 may also consider other factors in determining the insertion position, such as, without limitation, how many times the user has submitted content previously, how often the user's previously submitted content has been viewed by other users, and how highly the user's previously-submitted content is rated on the content sharing site. In one embodiment of the invention, the content sharing site may also associate a fee and/or a special level of user account with the higher prioritization in the moderation structure 172. Thus, for example, assume the content sharing site offers two types of user accounts—normal accounts and premium accounts. Accordingly, the site may also associate different fees with each of the two types of accounts. In such an example, the content rating component 170 may be configured to always prioritize content moderation for premium account holders when they submit content for moderation.

Additionally, in another embodiment, the content rating component 170 may be configured to approve or disapprove the submissions of certain users and bypass insertion into the moderation structure 172 altogether. Thus, for example, the content rating component 170 may be configured to always approve new submissions from featured artists of the content site, and to bypass the moderation structure 172 for these submissions altogether. Likewise, if a particular user has repeatedly submitted lewd or otherwise offensive content, the content rating component 170 may be configured to always reject content from this user without inserting it into the moderation queue. Furthermore, in yet another embodiment, the content rating component 170 may be configured to scan the submitted content for particular keywords that may indicate illegal or threatening activities. Upon detecting such activities, may insert the suspicious content at a prioritized position in the moderation queue so that the activity may be reported to the authorities more quickly.

Advantageously, the method 500 rewards users who invest a substantial amount of time and effort into creating content for the site. As such, the method 500 may improve the appeal of the content sharing site by incentivizing the submission of high-effort and interesting content. That is, by featuring artists based on the estimated effort they put into their work, the method 500 encourages users to put more effort into their submissions. Furthermore, as users spend more time and effort in creating content, the overall quality of their content (and thus the content on the content sharing site) may increase as well. In addition, by encouraging users to spend more time creating content, the method 500 also encourages users to spend more time visiting the content sharing site, which may result in increased traffic for the site.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for managing user-created content on a site, comprising:
   providing an interface configured to allow users to interactively create content;
   monitoring, in real-time while the first user is actively using the provided interface to create an instance of content for the site, one or more editorial actions performed by a first user to modify an existing portion of the instance of content;
   determining an effort value for the created instance of content based on the monitored one or more editorial actions, by operation of one or more computer processors, wherein the effort value quantifies an estimated amount of effort expended by the first user in creating the instance of content; and
   based at least in part on the determined effort value, affecting at least one of (i) moderation of the created instance of content and (ii) sharing of the created instance of content, on the site.

2. The method of claim 1, wherein affecting the moderation of the created instance of content further comprises:
   determining a position for inserting the created instance of content into a moderation structure, based on the calculated effort value; and
   inserting the created instance of content into the moderation structure for review by a moderator at the determined position.

3. The method of claim 2, wherein determining the position for inserting the created instance of content into the moderation structure is further based on other instances content previously created by the first user using the provided interface.

4. The method of claim 3, wherein determining the position for inserting the created instance of content into the moderation structure is further based on at least one of (i) a previous effort value associated with the other instances of content previously created by the first user, (ii) a user rating associated with the other instances of content previously created by the first user, wherein the user rating represents how favorable other users of the site found the other instances of content, (iii) a likelihood of approval associated with the other instances of content previously created by the first user, wherein the approval rating describes how often the other instances of content were approved by moderators of the site, and (iv) an account type of the first user.

5. The method of claim 1, wherein affecting the sharing of the created instance of content further comprises:
   determining a previous effort value for other instances of content previously created by the first user; and
   designating the first user as a featured user of the site, based on at least in part the calculated effort value and the determined previous effort value.

6. The method of claim 5, wherein designating the first user as a featured user of the site is further based on at least one of (i) a user rating associated with the other instances of content previously created by the first user, wherein the user rating represents how favorable other users of the site found the other instances of content, (ii) a likelihood of approval associated with the other instances of content previously created by the first user, wherein the approval rating describes how often the other instances of content were approved by moderators of the site, and (iii) a number of times the first user has created instances of content on the site.

7. The method of claim 1, further comprising:
   upon determining the calculated effort value is less than a threshold effort value, discarding the created instance of content.

8. The method of claim 1, wherein calculating an effort value for the created instance of content is further based on at least one of (i) an amount of text in the created instance of content and (ii) a number of matches between the text in the created instance of content and a list of common words.

9. A system, comprising:
   a computer processor; and
   a memory containing a program that, when executed on the computer processor, performs an operation for managing user-created content on a site, the operation comprising:
      monitoring, in real-time while the first user is actively using the provided interface to create an instance of content for the site, one or more editorial actions performed by a first user to modify an existing portion of the instance of content;
      determining an effort value for the created instance of content based on the monitored one or more editorial actions, by operation of one or more computer processors, wherein the effort value quantifies an estimated amount of effort expended by the first user in creating the instance of content; and based at least in part on the determined effort value, affecting at least one of (i) moderation of the created instance of content and (ii) sharing of the created instance of content, on the site.

10. The system of claim 9, wherein affecting the moderation of the created instance of content further comprises:
determining a position for inserting the created instance of content into a moderation structure, based on the calculated effort value; and
inserting the created instance of content into the moderation structure for review by a moderator at the determined position.

11. The system of claim 10, wherein determining the position for inserting the created instance of content into the moderation structure is further based on other instances content previously created by the first user using the provided interface.

12. The system of claim 11, wherein determining the position for inserting the created instance of content into the moderation structure is further based on at least one of (i) a previous effort value associated with the other instances of content previously created by the first user, (ii) a user rating associated with the other instances of content previously created by the first user, wherein the user rating represents how favorable other users of the site found the other instances of content, (iii) a likelihood of approval associated with the other instances of content previously created by the first user, wherein the approval rating describes how often the other instances of content were approved by moderators of the site, and (iv) an account type of the first user.

13. The system of claim 9, wherein affecting the sharing of the created instance of content further comprises:
determining a previous effort value for other instances of content previously created by the first user; and
designating the first user as a featured user of the site, based on at least in part the calculated effort value and the determined previous effort value.

14. The system of claim 13, wherein designating the first user as a featured user of the site is further based on at least one of (i) a user rating associated with the other instances of content previously created by the first user, wherein the user rating represents how favorable other users of the site found the other instances of content, (ii) a likelihood of approval associated with the other instances of content previously created by the first user, wherein the approval rating describes how often the other instances of content were approved by moderators of the site, and (iii) a number of times the first user has created instances of content on the site.

15. The system of claim 9, the operation further comprising:
upon determining the calculated effort value is less than a threshold effort value, discarding the created instance of content.

16. The system of claim 9, wherein calculating an effort value for the created instance of content is further based on at least one of (i) an amount of text in the created instance of content and (ii) a number of matches between the text in the created instance of content and a list of common words.

17. A non-transitory computer-readable medium containing a program that, when executed, performs an operation for managing user-created content on a site, the operation comprising:
providing an interface configured to allow users to interactively create content;
monitoring, in real-time while the first user is actively using the provided interface to create an instance of content for the site, one or more editorial actions performed by a first user to modify an existing portion of the instance of content;
determining an effort value for the created instance of content based on the monitored one or more editorial actions, by operation of one or more computer processors, wherein the effort value quantifies an estimated amount of effort expended by the first user in creating the instance of content; and
based at least in part on the determined effort value, affecting at least one of (i) moderation of the created instance of content and (ii) sharing of the created instance of content, on the site.

18. The non-transitory computer-readable medium of claim 17, wherein affecting the moderation of the created instance of content further comprises:
determining a position for inserting the created instance of content into a moderation structure, based on the calculated effort value; and
inserting the created instance of content into the moderation structure for review by a moderator at the determined position.

19. The non-transitory computer-readable medium of claim 18, wherein determining the position for inserting the created instance of content into the moderation structure is further based on other instances content previously created by the first user using the provided interface.

20. The non-transitory computer-readable medium of claim 19, wherein determining the position for inserting the created instance of content into the moderation structure is further based on at least one of (i) a previous effort value associated with the other instances of content previously created by the first user, (ii) a user rating associated with the other instances of content previously created by the first user, wherein the user rating represents how favorable other users of the site found the other instances of content, (iii) a likelihood of approval associated with the other instances of content previously created by the first user, wherein the approval rating describes how often the other instances of content were approved by moderators of the site, and (iv) an account type of the first user.

21. The non-transitory computer-readable medium of claim 17, wherein affecting the sharing of the created instance of content further comprises:
determining a previous effort value for other instances of content previously created by the first user; and
designating the first user as a featured user of the site, based on at least in part the calculated effort value and the determined previous effort value.

22. The non-transitory computer-readable medium of claim 21, wherein designating the first user as a featured user of the site is further based on at least one of (i) a user rating associated with the other instances of content previously created by the first user, wherein the user rating represents how favorable other users of the site found the other instances of content, (ii) a likelihood of approval associated with the other instances of content previously created by the first user, wherein the approval rating describes how often the other instances of content were approved by moderators of the site, and (iii) a number of times the first user has created instances of content on the site.

23. The non-transitory computer-readable medium of claim 17, wherein calculating an effort value for the created instance of content is further based on at least one of (i) an amount of text in the created instance of content and (ii) a number of matches between the text in the created instance of content and a list of common words.

24. A computer-implemented method for moderating user-created content on a site, comprising:
- providing an interface configured to allow users to interactively create content;
- receiving a first instance of user-created content from a first user for inclusion on the site, wherein the first instance of user-created content is created by the first user using the provided interface;
- determining, by operation of one or more computer processors, a position for inserting the first instance of user-created content into a moderation data structure, based on at least one of:
  - (i) other instances of content previously created by the first user using the provided interface,
  - (ii) a user rating associated with the other instances of content previously created by the first user, wherein the user rating represents how favorable other users of the site found the other instances of content,
  - (iii) a likelihood of approval associated with the other instances of content previously created by the first user, wherein the approval rating describes how often the other instances of content were approved by moderators of the site, and
  - (iv) an account type of the first user,
- wherein the moderation data structure is configured such that instances of content within the moderation data structure are retrieved for display in a user interface in a predefined order based on individual positions of the instances of content within the moderation data structure,
- wherein instances of user-created content are not publicly accessible on the site until retrieved from within the moderation data structured and approved using the user interface for inclusion on the site, and
- wherein determining the position for inserting the first instance of user-created content into the moderation data structure, is further based on an effort value for the first instance of user-created content, wherein the effort value quantifies an estimated amount of effort expended by the first user in creating the first instance of user-created content, and wherein the effort value is calculated based on one or more editorial actions performed by the first user while the first user was actively creating the content using the provided interface; and
- inserting the created first instance of user-created content into the moderation data structure for review at the determined position.

25. The method of claim 1, wherein the created instance of content includes pictorial content, wherein the existing portion of the instance of content comprises one or more visual elements within the pictorial content, and wherein the modification further comprises, for one of the one of the one or more visual element, at least one of (i) resizing the visual element, (ii) repositioning the visual element, (iii) reshaping the visual element and (iv) removing the visual element.

* * * * *

UNITED STATES PATENT AND TRADEMARK OFFICE
CERTIFICATE OF CORRECTION

PATENT NO. : 9,652,551 B2
APPLICATION NO. : 12/872621
DATED : May 16, 2017
INVENTOR(S) : Michael Ingoldby et al.

Page 1 of 1

It is certified that error appears in the above-identified patent and that said Letters Patent is hereby corrected as shown below:

In the Claims

Column 18, Line 25, Claim 25, after "one of the" delete "one of the".

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*